US012711311B1

(12) United States Patent
Dillon et al.

(10) Patent No.: US 12,711,311 B1
(45) Date of Patent: Aug. 18, 2026

(54) MEAN EMBEDDINGS FOR APPLICATION PROGRAMMING INTERFACE CALLS

(71) Applicant: Amazon Technologies, Inc., Seattle, WA (US)

(72) Inventors: Michael Dillon, Bainbridge Island, WA (US); Sharon Alpert, Kirkland, WA (US); Meet Prakash Vadera, Seattle, WA (US); Paul Aksenti Savastinuk, Bainbridge Island, WA (US); Muhammad Usman Aleem, Bellevue, WA (US); Eduard Oks, Redmond, WA (US); Andrew Michael Smith, Burien, WA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 18/538,651

(22) Filed: Dec. 13, 2023

(51) Int. Cl.

| | |
|---|---|
| ***G06F 40/279*** | (2020.01) |
| ***G06F 17/18*** | (2006.01) |
| ***G06F 40/284*** | (2020.01) |
| ***G06N 20/00*** | (2019.01) |

(52) U.S. Cl.
CPC ............ *G06F 40/284* (2020.01); *G06F 17/18* (2013.01)

(58) Field of Classification Search
CPC .... G06F 40/279; G06F 40/284; G06F 40/289; G06F 40/30; G06F 40/35; G06N 20/00; G10L 15/22
USPC ..................... 704/1, 9, 10, 270, 275; 706/12
See application file for complete search history.

(56) References Cited

U.S. PATENT DOCUMENTS

| | | | | |
|---|---|---|---|---|
| 9,589,578 | B1 * | 3/2017 | Dippenaar | G10L 15/22 |
| 2017/0091162 | A1 * | 3/2017 | Emanuel | G06F 40/169 |
| 2022/0067280 | A1 * | 3/2022 | Wagner | G06F 40/30 |
| 2023/0307127 | A1 * | 9/2023 | Zhi | G06F 40/40 |
| 2024/0096125 | A1 * | 3/2024 | Yebes Torres | G06F 40/30 |
| 2025/0045393 | A1 * | 2/2025 | Rokka Chhetri | G06F 21/566 |
| 2025/0078822 | A1 * | 3/2025 | Perkins | G10L 15/22 |
| 2025/0097226 | A1 * | 3/2025 | Fleming | G06F 40/30 |

(Continued)

OTHER PUBLICATIONS

Hewitt, "Initializing New Word Embeddings for Pretrained Language Models", Available online at: https://nlp.stanford.edu/~johnhew/vocab-expansion.html, Accessed from internet on Mar. 25, 2025, pp. 1-11.

*Primary Examiner* — Martin Lerner
(74) *Attorney, Agent, or Firm* — Kilpatrick Townsend & Stockton LLP

(57) ABSTRACT

Techniques are described for API call generation. An example method includes a system generating a plurality of statement tokens that represent the user statement. The system can identify a plurality of embeddings associated with the plurality of statement tokens. The system can determine a mean embedding based at least in part on the plurality of embeddings. The system can identify the first candidate information element token of an API call and the second candidate information element token of the API call from a vocabulary based at least in part on the mean embedding and the prompt. The system can generate a first probability distribution for the first candidate information element token and the second candidate information element token. The system can select the first candidate information element token based at least in part on a first probability of the first candidate information element token.

11 Claims, 9 Drawing Sheets

(56) References Cited

U.S. PATENT DOCUMENTS

| | | | | |
|---|---|---|---|---|
| 2025/0104087 | A1* | 3/2025 | Subramanian | G06F 40/35 |
| 2025/0165228 | A1* | 5/2025 | Libbey | G06F 8/31 |

* cited by examiner

300

302

System: You are a chat assistant (“Assistant”) conversing with a human (“Human”). Follow this dialog structure to have an engaging and helpful conversation:
Assistant: # respond to “Human” using available information
Action: # request additional information or perform actions requested by Human

304

Context: Human has following devices:
-device endpoint is deviceEndpointID99, its name is “front porch light”, its appliance type is light, its supported actions are adjustBrightness, getBrightness, getPower, setPower
-device endpoint is deviceEndpointID59, its name is “front driveway”, its appliance type is camera, motion_sensor, its supported actions are getMotionSensor
-device endpoint is deviceEndpointID46, its name is “kitchen light”, its appliance type is light, its supported actions are adjustBrightness, getBrightness, getPower, setPower Human: turn up the kitchen light please

MEAN EMBEDDINGS FOR APPLICATION PROGRAMMING INTERFACE CALLS

BACKGROUND

A virtual assistant can receive a verbal command to cause a connected device to perform an action. In some instances, the command can be for the virtual assistant to initialize a service, such as a music streaming service that stream music via a speaker. In other instances, the command can be for the virtual assistant to adjust the volume of a radio.

BRIEF DESCRIPTION OF THE DRAWINGS

Various embodiments in accordance with the present disclosure will be described with reference to the drawings, in which:

FIG. 3 is an illustration of an example prompt, according to embodiments of the present disclosure.

DETAILED DESCRIPTION

Figure 1:
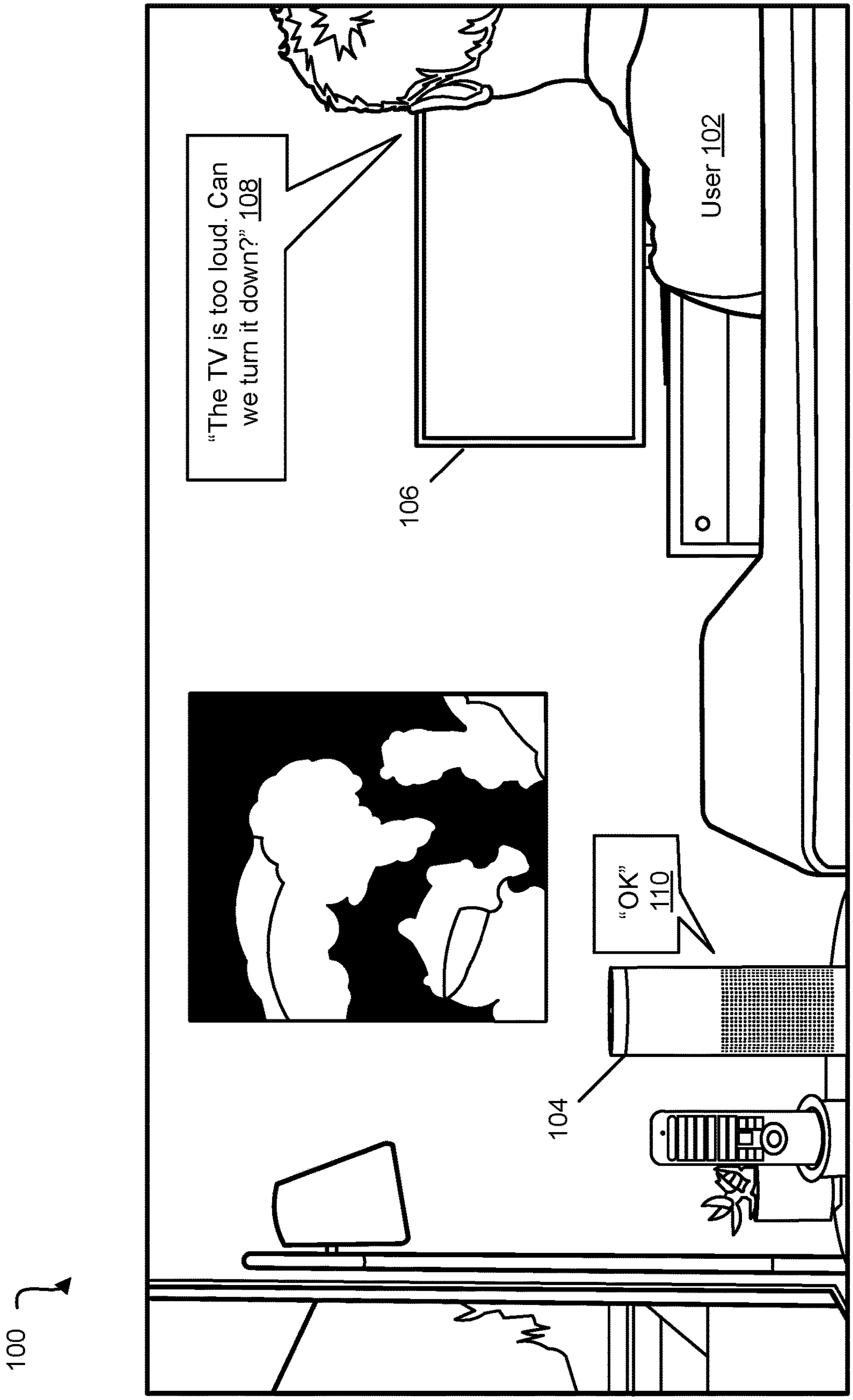
FIG. 1 illustrates an example situation for customized token generation, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, token compression for generating application programming interface (API) calls. In an example, a first computing system (e.g., a cloud-based service) can receive a user's statement (e.g., a continuous stream of audio that is converted into a continuous stream text such as a statement or a manually inputted text) from a virtual assistant. The statement can be directed toward a second computing system (e.g., a television). The virtual assistant can include a combination of hardware and software, where such combination can include a processor and a memory that stores program code for a virtual assistant application in the user's home. The statement can include a command for a device in the user's home. The first computing system can split the continuous stream of text into individual tokens, which can be represented as numerical values. The computing system can use a machine learning model that includes an embedding layer that can map a respective integer value associated with each token to an embedding in an embedding space. The machine learning model can then calculate the mean value of each of the respective embeddings to determine a mean embedding. The mean embedding permits the machine learning model to preserve the semantic and syntactic relationships between the underlying tokens. The mean embedding can further direct the machine learning model toward a set of customized tokens of the model. Based on the mean embedding, the machine learning model can generate a probability distribution which is associated with a set of customized tokens. The machine learning model can use an algorithm to select a customized token based on the probability distribution. The first computing system can further generate an application programming interface (API) using the customized token. The first computing system can further transmit the API call to the user's device to execute the user's command. It should be appreciated that for the purpose of clarity, integers and means are described, but other numerical values and statistical measures are possible.

The first computing system can differ from conventional computing systems in many different ways. For example, the first computing system can determine the output token (e.g., the customized token) in a single pass. Conventional computing systems recursively generate output tokens via multiple passes. For example, a conventional system can receive a statement and use a tokenizer to tokenize the statement. The conventional computing system can then map each token to an embedding in an embedding space. The conventional computing system can then use the embeddings to generate a probability distribution for a first token of an output. The conventional computing system can then select a token based on the probability distribution. The conventional computing system can then generate a second probability distribution and select a second token of the output. In other words, the output is a combination of recursively selected tokens. For example, if the output is an API call [getMode], the output from the conventional computing system can actually output the subtokens [get], [mo], and [de].

On the other hand, the first computing system described herein can create single output tokens (e.g., [getMode]) via a single pass based on the mean embedding. Once the machine model receives the mean embedding, the machine learning model can select its search space to a set of customized tokens. Rather than relying upon the entire vocabulary, the machine learning model can generate a probability distribution from only the customized tokens. The machine learning model can then select the customized token based on the probability of the customized token being the correct response to the statement.

Embodiments of the present disclosure provide several technical advantages over conventional token generation techniques. The first computing system can reduce latency by generating a token over a single pass. As indicated above, a conventional system can take three passes to generate the subtokens [get], [mo], and [de]. On the other hand, the first computing system described herein can select the customized token [getMode] in single pass. The embodiments also provide enhanced security for the computing system. As indicated above, a conventional system can recursively select tokens based on a previous token. For example, the conventional system can select subtokens [mo] based on [get]. The conventional system can further select subtoken [de] based on [get] and [mo]. Therefore, there are three opportunities for a malicious software to introduce an incorrect subtoken to replace one of [get], [mo], and [de]. However, the herein described system uses a single pass to select a customized token, so that a malicious software has a much smaller opportunity, if any, to surreptitiously introduce an incorrect subtoken.

FIG. 1 illustrates an example situation 100 for customized token generation, according to embodiments of the present disclosure. A user 102 can be situated in an environment, such as a living room, and in proximity to a virtual assistant 104 that is connected with one or more devices. The virtual assistant 104 can include a combination of hardware and software that is operable to process, entirely or partially, natural language input and execute commands based on the natural language. As illustrated, the virtual assistant 104 can be connected to a television 106. It should be appreciated that the virtual assistant 104 can be connected directly to a device, or indirectly via a home networking platform. The user 102 can be enjoying the use of the television and make statement 108. As illustrated, the statement 108 can be, "The TV is too loud. Can we turn it down?" It can be seen that the statement identifies a device ("TV") and identifies an action ("turn it down") in natural language. The virtual assistant 104 can be in proximity to the user 102 and pick up the statement 108 (e.g., detect the corresponding audio via a set of microphones and generate audio data that corresponds to the audio). The virtual assistant 104 can transmit the statement 108 (e.g., the audio data) to a language processing service. The language processing service can be a cloud based service that is implemented in a remote data center, although in one embodiments the processing service is local to the virtual assistant 104. The language processing service can include a tokenizer and a machine learning model that has been trained on language processing. The tokenizer can tokenize the statement and assign each token a respective integer value. The tokenizer can pass the integer values to the machine learning model. The machine learning model can be trained to map the tokens to embeddings in an embedding space. Each embedding can be considered a multi-dimensional vector that represents the semantic meaning of an underlying token. In some instances, the embeddings include positional encodings that relay information as to the sequence of the tokens in the statement. In these instances, the combination of the embeddings and the positional encodings can be used to generate input embeddings that are used by the machine learning model. In any case, the machine learning model can determine the mean of the embeddings to determine a mean embedding. As the mean embedding is the result of the mean of the token-based embeddings, the mean embedding can retain some of the semantic and syntactic meaning of the underlying tokens.

The machine learning model can be trained on an additional customized vocabulary. The customized vocabulary can include customized tokens. In other words, if the vocabulary previously included the subtokens [get], [mo], and [de], the customized vocabulary can include the token [getMode]. Based on received mean embedding (e.g., mean vector), the machine learning model can select the search space for candidate tokens to the customized tokens. Therefore, the machine learning model can generate a probability distribution from the customized tokens.

This can be beneficial to separate relevant commands from irrelevant commands. For example, the customized tokens can be commands to change a state of a device. As illustrated, the user 102 is asking to turn the volume of the television. This command would be different than, for example, asking the virtual assistant 104 to order supplies to clean the television. Using the herein described techniques, the virtual assistant 104 could still help the user 102 order supplies to clean the television. However, embeddings can be used to generate a probability distribution for subtokens to be used to order cleaning supplies from the general vocabulary whereas the mean embedding can be used to generate a probability distribution for customized tokens to command the television to decrease the volume from the customized vocabulary.

The language processing service can transmit a message with one or more customized tokens to a home platform service. The home platform service can authenticate the message, and can transmit an API call to the television 106 to cause the television 106 to reduce the volume.

Once the television 106 has reduced the volume, the virtual assistant 104 can output a response statement 110 (e.g., as a text-to-speech output), such as "OK" to indicate that the user's command has successfully been completed.

It should be appreciated that although the embodiments herein are described with respect to a home device network domain, the embodiments can be applied to various other domains, such as a music domain, a software domain, a chatbot domain. In other words, the embodiments herein can be used to permit a machine learning model to map a statement to customized tokens with respect to various domains.

Figure 2:
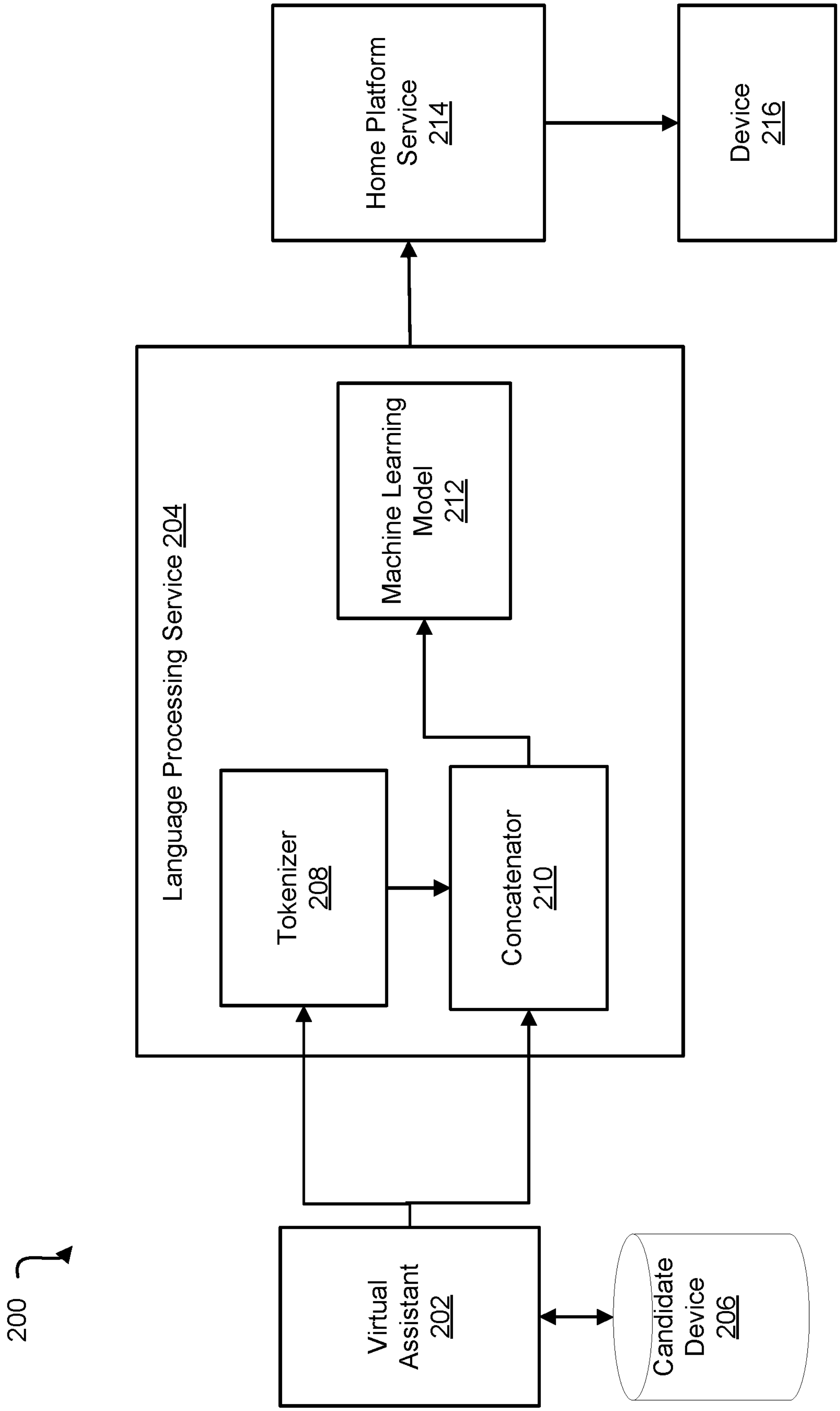
FIG. 2 is an illustration of an example system for custom token selection, according to embodiments of the present disclosure.

FIG. 2 is an illustration 200 of an example system for custom token selection, according to embodiments of the present disclosure. A virtual assistant 202 can transmit information to be used to generate an API call to a language processing service 204 (which is an example of the language processing service described in FIG. 1). In particular, a tokenizer 208 of the language processing service 204 can receive a string of text (e.g., text generated from audio detected by the virtual assistant, where the text is generated according to an automatic speech recognition (ASR) algorithm applied to the audio data, and where the ASR algorithm can be executed by the virtual assistant 202 or by the language processing service 204) and break down the text into smaller parts known as tokens. The tokenizer 208 can perform various pre-processing steps, such as converting all letters to lower case, making the font uniform, and addressing special characters. Once the preprocessing steps are finished, the tokenizer 208 can break down the string of text into words and subwords. For example, the text string, "It is too dark in here" can be broken down in the words "It," "is," "too," "dark," "in," and "here." Or in some case, the text string can be broken down further into subwords, such "here" can be broken down as "he" and "re". Each token can be assigned an integer value that is understandable by a machine learning model. The tokenizer 208 can pass the integer values to a concatenator 210.

The virtual assistant 202 can further provide a prompt to the concatenator 210 that includes list of devices that are associated with the user and a list of actions that each device can perform. For example, the virtual assistant 202 can access a candidate devices database 206 that includes each device associated with a user account of the user. The user can use a software platform that enables the user to control multiple devices via a network, such as a home network, based on their user account. The user can register a set of devices to the software platform in association with the user account. Each device registered to the platform can include a nickname, a device endpoint identifier (ID) and a set of actions that can be performed by the device. The set of devices can further create subsets of devices to control different groups of devices. For example, the user account can indicate a subset of devices used for entertainment, or a group light producing devices. The nicknames, the device endpoint IDs can be stored in the candidate device database 206.

The concatenator 210 can concatenate the prompt and the tokens, or more particularly, the prompt and the integer values. For example, if the integer values are [3244, 5600, 4444] and the prompt includes [context, a list of candidate devices, user statement], the concatenation can include [context, a list of candidate devices, user statement, 3244, 5600, 4444].

The concatenator 210 can transmit the concatenated prompt and integer values to a machine learning model 212. The machine learning model 212 (e.g., a large language model (LLM)) can be a pre-trained model and include various architectures, such as a transformer architecture. The machine learning model 212 can include an embedding layer for mapping the integer values associated with each token to a mean embedding. In some embodiments, the embedding layer can further be guided by the prompt. The embedding layer of the machine learning model can be initialized with a vocabulary and an embedding dimension. The embedding layer can further include an embedding matrix that can be used to identify embeddings. For example, in response to receiving the integer values, the embedding layer can perform a lookup operation using the embedding matrix to find a mean embedding that corresponds to the integer values. For example, the embedding layer can receive the integer values [0561] and [8909}, and perform the lookup operation to identify the corresponding mean embedding [0.1, 0.5, 0.3, . . . ]. The mean embedding can be mapped to a customized token that can be included in an API call.

The language processing service 204 is configured to output the API call to effectuate a command from a user (e.g., the user 102). It should be appreciated that the examples herein include generating API calls in response to user statements. One having ordinary skill in the art can see that the techniques herein can be applied to generate customized tokens in response to various inputs. The language processing service 204 can output an API call having the following format:

Action: <DOMAIN>.<API_NAME>(endpointIds=[<DEV1>, <DEV2>, . . . ], arg=value, . . . ): [EOS], where "Action" can be an indication that the machine learning model is to output an API call. The "domain" can be a name to which the API call is associated with, such as "Smarthome, or "Automations." Multiple candidate domains may be chosen and the language processing service 204, and in particular the machine learning model 212, can determine the probabilities for each candidate domain, and then select the domain with the highest probability of being associated with the input (e.g., statement) has the domain. The "API NAME" can include an action to be performed, such as "turnOn" or "CreateAutomation." Similar to the domain, the language processing service 204 can select the API name with the highest probability of being directed to the command indicated by the input. The API call can further include device endpoint IDs, which are a list of available devices that the user can make an API call to control. The device endpoints can be selected from a set of candidate devices provided to the machine learning model 212 via a prompt. In a conventional system, a machine learning model can recursively select output tokens based on previously selected tokens. In particular, the conventional machine learning model can be trained to generate probability distributions using an activation function. Each probability distribution can include the probability for candidate output tokens based on a previously selected token. Therefore, rather than output a domain, API name, or device endpoint IDs in one pass, the conventional machine learning model may perform multiple passes.

Consider an example, in which the conventional machine learning model receives the statement "it's too dark in here." The outputted API name in response to the statement may be [setBrightness]. However, the conventional machine learning model may not be trained to output the API as a single token. Rather the conventional machine learning model may output the subtokens [set], [bri], [ght], and [ness]. In other words, the conventional machine learning model may require four passes to identify each subtoken. For example, the conventional machine learning model can generate a first probability distribution that results in the selection of the subtoken [set]. The conventional machine learning model can then generate a second, third, and fourth probability distribution. Furthermore, the conventional machine learning model may need to take multiple passes to identify the subtokens that form each token associated with the probability distribution.

The embodiments described herein provide techniques to permit the machine learning model 212 to identify each token as a single token. In other words, rather than taking four passes to identify each of the subtokens [set], [bri], [ght], and [ness], the machine learning model can identify the customized token [setBrightness] in one pass.

To identify a customized token in one pass, the machine learning model 212 can use a mean embedding generated from a set of embeddings. The components of each embedding can be used to generate the mean embedding. As a simple example, consider an embedding A with values [x, y, and z] and embedding B with values [m, n, and o]. The mean embedding M can be calculated as:

$$M = [(x+m)/2, (y+n)/2, (z+o)/2]$$

As the mean embedding is based on the values of the embeddings (e.g., embedding A and embedding B), the mean embedding can preserve the semantic and syntactic relationships between the respective tokens associated with the vectors.

The mean embedding can be calculated prior to runtime. For example, the mean embedding can be calculated at a pre-processing step. The machine learning model can then be trained to map a particular set of integer values to particular a mean embedding. For example, the machine learning model can be trained to determine that a first set of integer values [3266, 5600, 4444] maps to a first mean embedding. The machine learning model can further be trained to determine that a second set of integer values [2222, 5760, 3644] maps to a second mean embedding.

The machine learning model 212 can pass the mean embedding through a projection layer, which applies a linear transformation to the mean embedding. The output of the projection layer can include a logit. The logit can be passed through an activation function that can generate a probability distribution for candidate customized tokens. The sum of the values of each probability of the probability can be 1. The customized token can be a part of a set of customized tokens that include single customized tokens that can be used, for example, for a domain, an API name, and a device endpoint ID. Therefore, rather than generate multiple probability distributions for subtokens, the machine learning model 212 can generate a respective single probability distribution for candidate domain tokens, candidate API name tokens, and candidate device endpoint ID tokens. As described below, the machine learning model 212 can further select a customized domain token, customized API name token, and customized device endpoint ID token based on the respective probability distributions. For example, the selected customized domain token, customized API name token, and customized device endpoint ID token can be selected based on each having a highest probability in the respective probability distributions.

Furthermore, the embedding layer can further be trained to select a candidate domain based on the list of devices from the prompt. Additionally, the embedding layer can be trained to select only API names and device endpoint IDS that appear in the prompt. As indicated above, the conventional machine learning model can take multiple passes to respectively identify subtokens for a domain, API name, and device endpointID. The subtoken selected at each pass can increase the probability that the conventional machine learning model can select a domain that does not relate to the user's devices, an API name that is not associated with the user's devices, and a device endpoint ID for a device that is not associated with the user. By restricting the search space via the prompt, the herein described techniques can improve the success rate of the language processing service 204 selecting a correct domain, API name, and device endpoint ID.

The machine learning model 212 can use various methods to select a token for each probability distribution. Take for example, the probability distribution for the domain. The machine learning model 212 can use a greedy search algorithm, so that the algorithm simply selects the customized token with the highest probability. The machine learning model 212 can also use a top-n sampling algorithm, in which the algorithm selects a token from the tokens that have the top-n probabilities. In any case, the machine learning model 212 can further select a token for the API name and the device endpoint ID.

The language processing service 204 can further use the selected tokens to format an API call. For example, the format can be similar to API call format described above. The language processing service 204 can transmit a message that includes the API call to the home platform service 214. The home platform service 214 can be used to communicate with a user's devices and with one or more cloud services associated with the user's devices. The home platform service 214 can authenticate the message and determine whether the sender is authorized to make the request. Assuming that the message is authenticated and the sender is authorized, the home platform service 214 can determine which device to transmit the API call based on the device endpoint ID in the API call. The home platform service 214 can further transmit the API call to the device 216.

For example, referring back to FIG. 1, the home platform service 214 can transmit an API call for reducing the volume to the television 106. The television 106 can respond by reducing the volume and transmit a reply that the volume has been reduced. The home platform service 214 can transmit a message to the virtual assistant 104 that the volume has been reduced, and the virtual assistant 104 can respond to the user 102 with statement 110 (e.g., OK) or some other outputs (e.g., a text notification on a screen if the virtual assistant 104 includes such a screen).

FIG. 3 is an illustration of an example prompt 300, according to embodiments of the present disclosure. The prompt 300 can include instructions 302, that identify the instruction giver, the entity to receive the instruction, and an action to perform. As illustrated, the instructions 302 is provided by the system (e.g., language processing service reads, "You are a chat assistant ("Assistant") conversing with a human ("Human"). Follow this dialog structure to have an engaging and helpful conversation). The instructions 302 can further identify the assistant (e.g., machine learning model 212) as an entity to receive the instructions 302. The instructions 302 can further include an action for the assistant to take, which as illustrated is to request additional information or perform actions requested by the human (e.g., the user 102).

The prompt 300 can further include context 304, including the descriptions of the devices associated with the human. As illustrated, the human is associated with three devices. The first device has a device endpoint ID of deviceEndpointID99 and nickname of front porch light. The first device further has an appliance type of light and supports the actions adjustBrightess, getBrightness, getPower, and setPower. The second device has a device endpoint ID of deviceEndpointID59 and nickname of front driveway. The second device further has an appliance type of camera, motion sensor and supports the action getMotionSesnor. The third device has a device endpoint ID of deviceEndpointID46 and nickname of kitchen light. The third device further also has an appliance type of light and supports the actions adjustBrightess, getBrightness, getPower, and setPower.

The prompt 300 can further include a statement 306, which as illustrated can include "turn up the kitchen light please." The statement 306 can be the verbal command provided to the virtual assistant (e.g., virtual assistant 104) by the human (e.g., user 102). Additionally, the virtual assistant can collect the statement 306 provided by the human and transmit the statement 306 to a tokenizer (e.g., tokenizer 208). The tokenizer can convert the statement 306 into a mean embedding as described above. The tokenizer can further transmit the mean embedding to a concatenator (e.g., concatenator 210). The concatenator can concatenate the prompt 300 and the mean embedding, and transmit the concatenation to the machine learning model.

The machine learning model (e.g., machine learning model 212) can be trained to determine a domain, API name, and device endpoint ID based on the information provided in the context 304. For example, the machine learning model can be trained to select the customized tokens associated with candidate API names used for the probability distribution based on the mean embedding and the API names listed in the context 304. As illustrated, the search space for candidate API names would be restricted to customized tokens associated with adjustBrightess, getBrightness, getPower, setPower and getMotionSensor. In this sense, the machine learning model does not select an API name that is not associated with one of the user's devices. Additionally, the machine learning model can be trained to select the customized tokens associated with candidate device Endpoint IDs based on the mean embedding and the endpointIDs indicated by the context 304. Therefore, as illustrated, the search space for candidate device endPointIDs would be restricted to customized tokens associated with deviceEndpointID99, deviceEndpointID59, and deviceEndpointID46.

Figure 4:
FIG. 4 is an illustration of an example application programming interface (API) call, according to embodiments of the present disclosure.

FIG. 4 is an illustration of an example application programming interface (API) call 400, according to embodiments of the present disclosure. The API call 400 can include a domain 402, which can include a network that is associated with the target device. The machine learning model (e.g., machine learning model 212) of a language processing service (e.g., language processing service 204) can select a domain based on a probability that the API call 400 is to be directed to a device associated with the domain. In this instance, the prompt (e.g., prompt 300) can have indicated that the human is associated with three devices: a front porch light, a motion camera at the front driveway, and a kitchen light. Each of these device is likely associated with a home networking platform. Therefore, the activation function can assign a highest probability to a home networking platform named homePlatform for a probability distribution. The machine learning model can select the customized token homePlatform based on the probability. The API call 400 can further include an API name 404. As illustrated, the statement 306 includes "turn up the kitchen light" and the mean embedding can preserve the semantic and syntactic relationships of the underlying tokens for the statement (e.g., statement 306). Furthermore, based on the prompt, the candidate API names include the customized tokens adjustBrightess, getBrightness, getPower, setPower and getMotionSensor. The SoftMax activation layer can assign probabilities to each of the API names. Of all the candidate API names, it is likely that the customized token adjustBrightness has the highest probability for a response to the statement. Therefore, the machine learning model can select the customized token adjustBrightness to be included in the API call 400. According to the prompt, the candidate devices include a front porch light, a motion sensor camera, and a kitchen light. Based on a mean embedding generated from the statement, it is likely that the SoftMax activation function assigns a highest probability to the customized token deviceEndpointID46. The machine learning model can further select the customized token deviceEndpointID46 based on the probability.

The language processing service can transmit the API call 400 to a home platform service (e.g., home platform service 214) that can authenticate the message and determine whether the language processing service is authorized to transmit the API call 400. The home platform service 214 can further transmit the validated API call 400 to a device (e.g., device 216), which in this case can be a kitchen light. The kitchen light can include processing circuitry to process the API call 400 and increase the brightness of the kitchen light.

Figure 5:
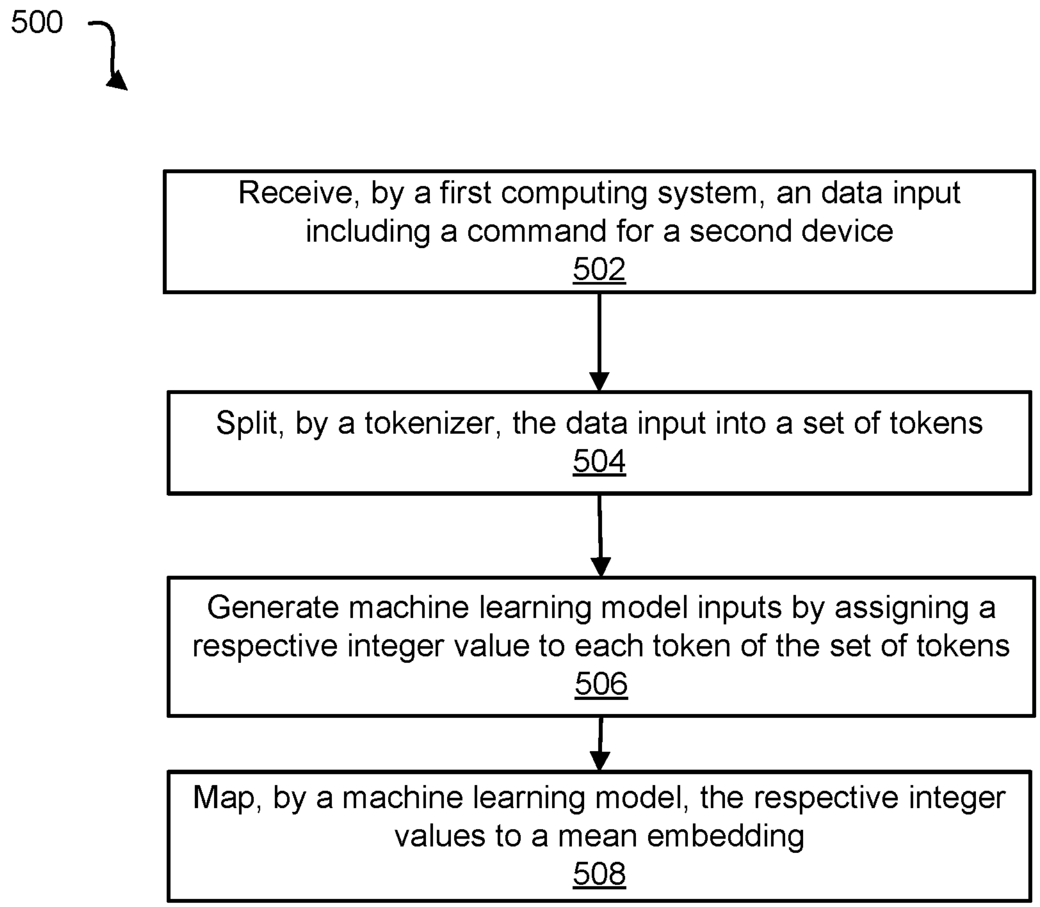
FIG. 5 is an example process for determining a mean embedding, according to embodiments of the present disclosure.

FIG. 5 is an example process 500 for determining a mean embedding, according to embodiments of the present disclosure. Some or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 502, the process can include a first computing system (e.g., a language processing service) receiving audio data or text that represents a statement including a command (or an indication of a command) for a second computing device. For example, a user can make a statement, such as "The back porch light needs to be off." The statement can be received by a virtual assistant that transmits the corresponding audio data to the first computing system or that converts such audio data into text via an ASR algorithm and sends the text to the first computing system. The statement can further be directed toward back porch light or a service that manages the back porch light.

At 504, the process can include a tokenizer of the first computing system splitting the text up into respective tokens or subtokens, where a token can be a respective word and a subtoken can be a portion of a word. If only audio data is received, the first computing system can apply thereto an ASR algorithm to generate the text. The tokenizer can use various techniques (e.g., Byte-pair encoding, Wordpiece) to split up the text. For example, the tokenizer can search for spaces between characters, compare character strings in the text to known words, or other appropriate methods.

At 506, the process can include the first computing system generating machine learning inputs by assigning each token or subtoken a respective integer value. The tokenizer can be initialized with a dictionary that assists the tokenizer to map the tokens to the respective integer values. The respective integer values are numerical representations of the tokens that can be understood by the machine learning model. The respective integer values can be transmitted to a machine learning model.

At 508, the process can include the machine learning model determining a mapping of the respective integer values to a mean embedding. In particular, the machine learning model can include one or more embedding layers that can map the respective integer values to the mean embedding.

The mean embedding can be calculated by performing an element-wise operation on a set of embeddings. The machine learning model can further have access to an expanded vocabulary that includes tokens and customized tokens. The machine learning model can further be trained to map the mean embedding to the customized tokens. In this sense, when the machine learning model is generating a probability distribution for the input embeddings (e.g., non-mean embeddings), the model can look to the tokens. However, if the machine learning model is generating a probability distribution for the mean embedding, the model can look to the customized tokens. For example, if the expanded vocabulary includes fifty-thousand tokens, tokens [00000]-[49000] can be non-customized tokens, whereas tokens [49001]-[49999] can be customized tokens. The machine leaning model can use the mean embedding to identify a customized token from tokens [49001]-[49999].

Figure 6:
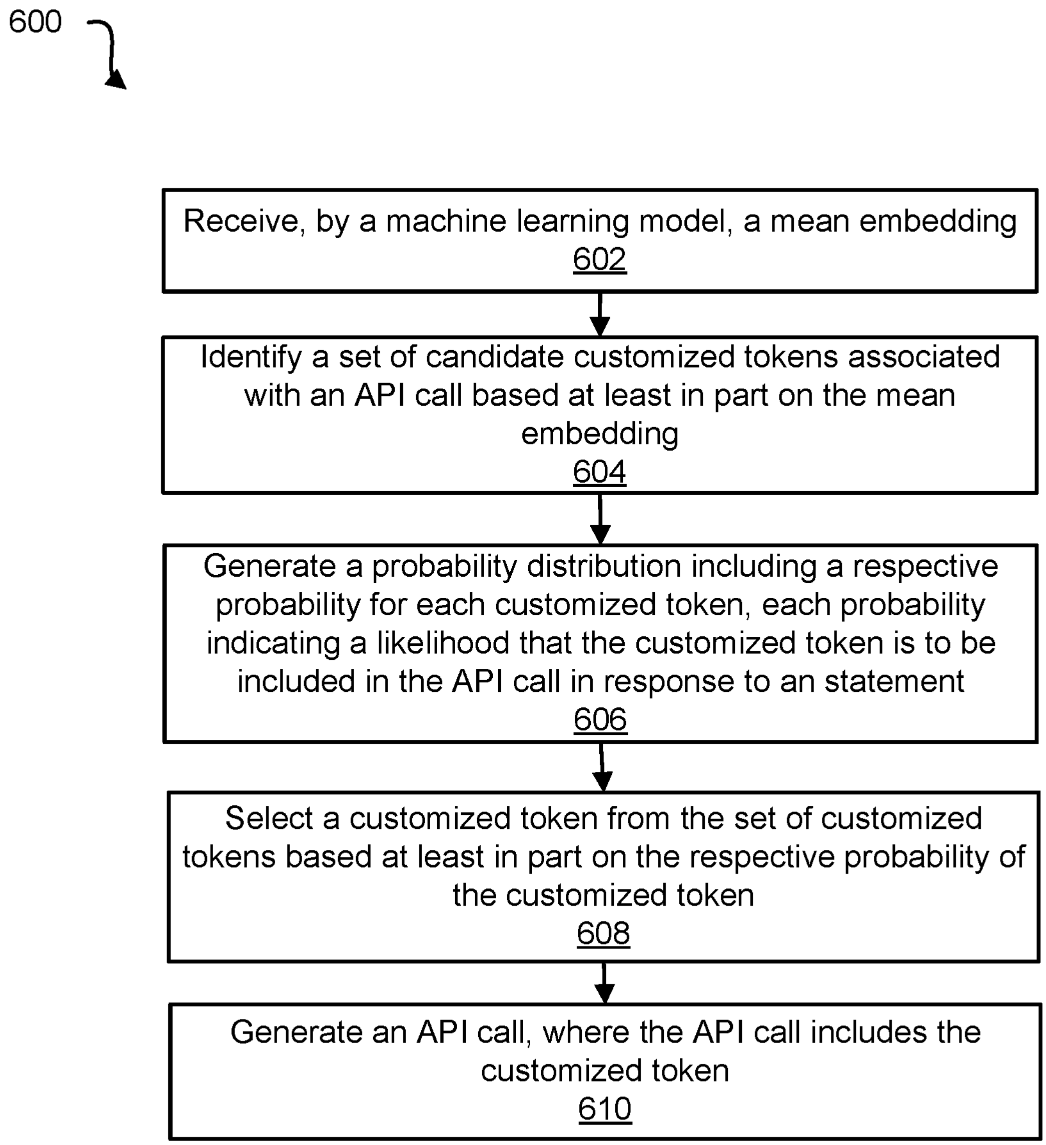
FIG. 6 is an example process for generating an API call, according to embodiments of the present disclosure.

FIG. 6 is an example process 600 for generating an API call, according to embodiments of the present disclosure. At 602, the process can include a layer of a machine learning model receiving a mean embedding, for example, the mean embedding generated in step 510.

At 604, the process can include the machine learning model identifying a set of candidate customized tokens based at least in part on the mean embedding. The customized tokens can be associated with an API call. For example, the customized tokens can relate to a domain, an API name, or an endpoint ID. In some instances, the machine learning model may select a first set of customized tokens for the domain, a second set of customized tokens for the API name, and a third set of customized tokens for a device endpoint. In some instances, the machine learning model can receive a prompt that indicates each device associated with a user. The machine learning model can be trained to further select the search space for the customized tokens to domain tokens, API name tokens, and device endpoints tokens associated with the prompt.

At 606, the machine learning model can generate a probability distribution including a respective probability for each customized token, each probability indicating a likelihood that the customized token is to be included in the API call in response to a statement. As indicated above, the machine learning model can generate a mean embedding for a domain, an API name, and a device endpoint ID. Consequently, the machine learning model, and in particular a SoftMax activation function, can generate a first probability distribution for candidate domain customized tokens, a second probability distribution for candidate API name customized tokens, and a third probability distribution for candidate device endpoint ID customized tokens.

At 608, the machine learning model can select a customized token from the set of customized tokens based at least in part on the respective probability of the customized token. As indicated above, the machine learning model can use various algorithms (e.g., greedy search, tom-n sampling) to select a customized token. The machine learning model can select a domain customized token, an API name customized token, and a device endpoint ID customized token.

At 610, a computing service (e.g., a language processing service) can generate an API call that includes the customized token. The computing service can format an API call to include the domain customized token, the API name customized token, and the device endpoint ID customized token. The API call can be formatted similarly as described with respect to FIG. 4.

Figure 7:
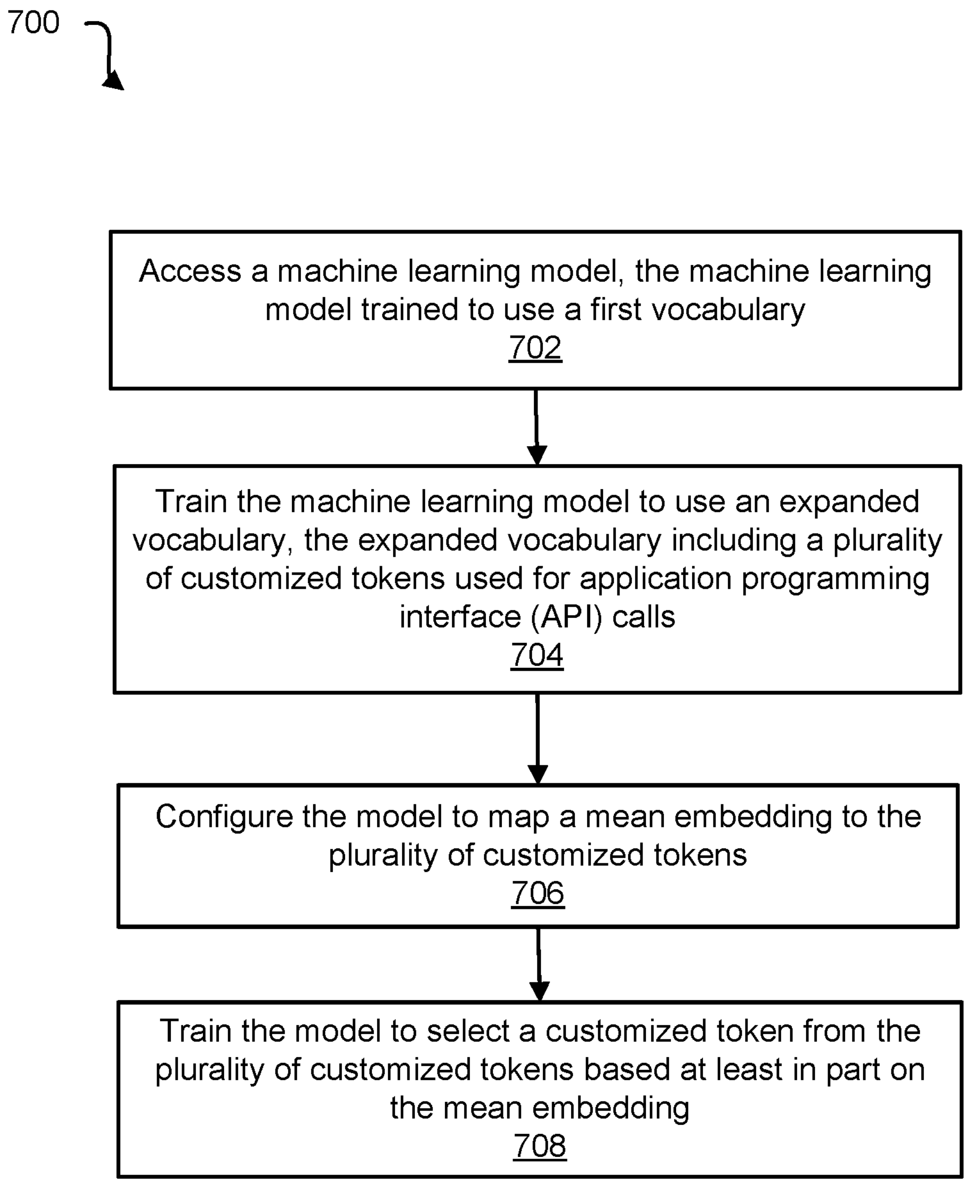
FIG. 7 is an example process flow for training a machine learning model for custom token generation, according to embodiments of the present disclosure.

FIG. 7 is an example process flow 700 for training a machine learning model for custom token generation, according to embodiments of the present disclosure. At 702, the process can include a computing system (a machine learning model training system) accessing a pre-trained machine learning model. The machine learning model can be trained to use a first vocabulary. The machine learning model can be trained on a vocabulary that includes tokens and subtokens. The machine learning model can be a commercially available machine learning model that is trained to recursively output multiple subtokens via multiple passes as described above.

At 704, the process can include the computing system training the pre-trained machine learning model to use an expanded vocabulary. The expanded vocabulary can include a set of customized tokens that are used for API calls. The training can include introducing the pre-trained machine learning model to single customized tokens for a domain, API name, and device endpoint ID for use in an API call.

At 706, the process can include configuring the pre-trained machine learning model to map a mean embedding to the set of customized tokens. The pre-trained machine learning model can be trained to map integer values for tokens to embeddings. The herein described machine learning model can further be trained to determine mapping to a particular mean embedding from a particular set of integer values. The herein described machine learning model can further be trained to map the mean embedding to the set of customized tokens.

At 708, the process can include training the pre-trained machine learning model to select a customized token from the set of customized tokens based at least in part on performing a determination of the mean embedding. For example, in the instance that a layer of the machine learning model receives a mean embedding, the layer can be triggered to only generate a single probability distribution. Furthermore, by receiving the mean embedding, the pre-trained machine learning model can be trained to select the search space based on the customized tokens. Therefore, each token associated with the probability distribution based on the mean embedding can be a customized token.

In addition, the pre-trained machine learning model can be trained to receive a prompt that includes a set of device endpoints IDs for devices associated with the user. The prompt can further include API names associated with each of the devices. The pre-trained machine learning model can further be trained to select the search space for tokens for candidate API names and device endpoint IDs based on the prompt. In this way, the machine learning model does not generate a domain, API name, or device endpoint ID for a device that the user does not have or for a functionality that a device cannot perform.

Figure 8:
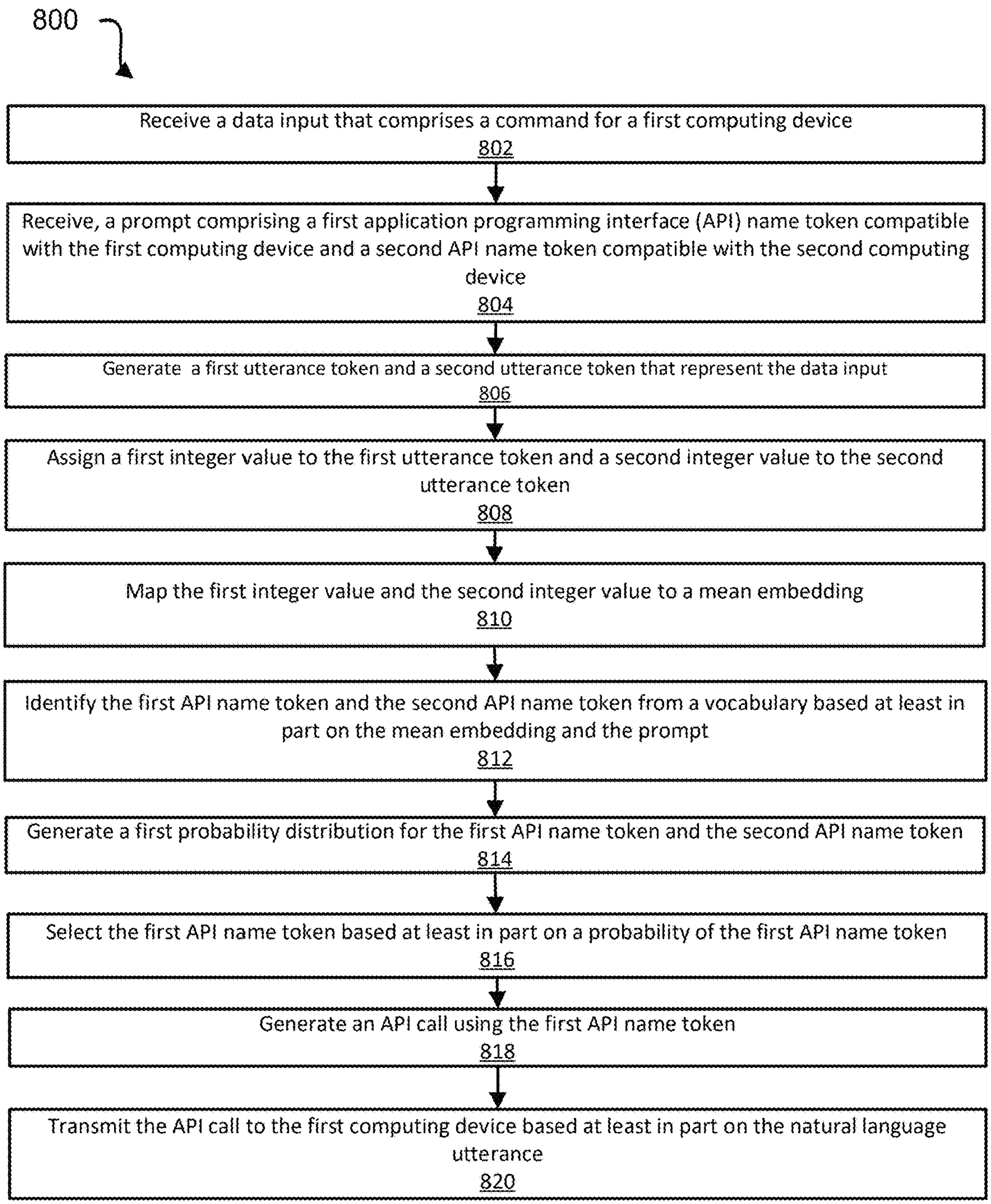
FIG. 8 is an example process flow for generating an API call, according to embodiments of the present disclosure.

FIG. 8 is an example process flow 800 for generating an API call, according to embodiments of the present disclosure. At 802, the process can include a computing system receiving a data input representing a natural language statement that comprises a command for a first computing device. The data input can include audio data or text data. The computing system can be a language processing service and the data input can be received via a virtual assistant.

At 804, the process can include the computing system receiving a prompt comprising a first application programming interface (API) name token compatible with the first computing device and a second API name token compatible with the second computing device. The prompt can include instructions, context, and the statement as described in FIG. 3

At 806, the process can include the computing system generating a first statement token and a second statement token that represent the natural language statement. The computing system can include a tokenizer that is configured to generate the tokens based on the data input.

At 808, the process can include the computing system assigning a first integer value to the first statement token and a second integer value to the second statement token. The integer values can be numeric representations that can be used as machine learning model inputs.

At 810, the process can include the computing system mapping the first integer and the second integer value to a mean embedding. In particular, the computing system can map the particular combination of the first integer value and the second integer value to the mean embedding. For example the first integer value can be associated with a first embedding and the second integer value can be associated with a second embedding. The computing system can map to the mean embedding based on the combination of the first embedding and the second embedding. The computing system can include a machine learning model and the machine learning model can include an embedding layer that is trained to map the integer values to the mean embedding.

At 812, the process can include the computing system identifying the first API name token and the second API name token from a vocabulary based at least in part on the mean embedding and the prompt. The API tokens can each be a single customized token.

At 814, the process can include the computing system generating a probability distribution for the first API name token and the second API name token. The machine learning model can use a SoftMax activation layer to generate the probability distribution.

At 816, the process can include the computing system selecting the first API name token based at least in part on the probability distribution indicating a higher probability for the first API name token than the second API name token. The machine learning model can use an algorithm to select the first API name token.

At 818, the process can include the computing system generating an API call using the first API name token. The API call can have a format similar to the format of FIG. 4.

At 820, the process can include the computing system transmitting the API call to the first computing device. For example, the API call can be to reduce the volume of the television as described with respect to FIG. 1.

Figure 9:
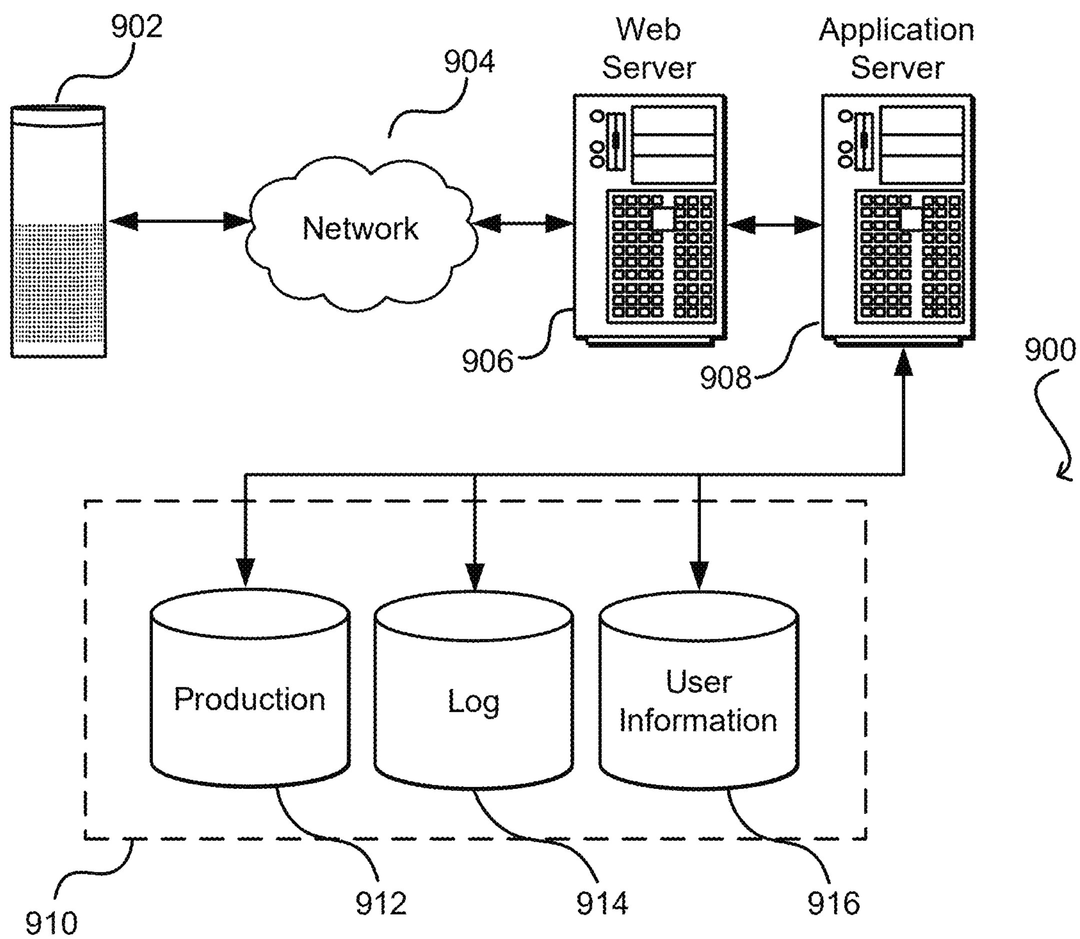
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system comprising:

one or more processors; and one or more computer-readable media having stored thereon a sequence of instructions, when executed, cause the one or more processors to:

receive input data representing a user statement that comprises a command for a first computing device;

generate a first statement token and a second statement token that represent the user statement;

determine a first integer value associated with the first statement token;

determine a second integer value associated with the second statement token;

determine a mean embedding based at least in part on the first integer value and the second integer value;

receive information associated with a user account, wherein the user account is associated with the first computing device;

select a search space for a candidate information element token based at least in part on the information;

identify the candidate information element token of an API call from a vocabulary based at least in part on the mean embedding and the search space;

generate a probability distribution for the candidate information element token;

select the candidate information element token based at least in part on a probability of the candidate information element token, the probability indicated by the probability distribution; and generate the API call using the candidate information element token.

2. The computing system of claim 1, wherein the sequence of instructions, when executed, further cause the one or more processors to:

receive domain information associated with the user account; and map the mean embedding to a domain token of the vocabulary based at least in part on the domain information, wherein the candidate information element token is the domain token.

3. The computing system of claim 1, wherein the sequence of instructions, when executed, further cause the one or more processors to:

receive API name information associated with the user account; and map the mean embedding to an API name token of the vocabulary based at least in part on the API name information, wherein the candidate information element token is the API name token.

4. The computing system of claim 3, wherein the sequence of instructions, when executed, further cause the one or more processors to:

determine the probability for the API name token based at least in part on the mean embedding.

5. The computing system of claim 1, wherein the sequence of instructions, when executed, further cause the one or more processors to:

receive device endpoint identifier information associated with the user account; and map the mean embedding to a device endpoint identifier token of the vocabulary based at least in part on the device endpoint identifier information, wherein the candidate information element token is the device endpoint identifier token.

6. The computing system of claim 5, wherein the sequence of instructions, when executed, further cause the one or more processors to:

determine the probability for the device endpoint identifier token based at least in part on the mean embedding.

7. The computing system of claim 1, wherein the sequence of instructions, when executed, further cause the one or more processors to:

include the candidate information element token into the API using an API call format, wherein the API call is generated based at least in part on the API call format.

8. The computing system of claim 1, wherein the sequence of instructions, when executed, further cause the one or more processors to:

determine a first embedding associated with the first integer value;

determine a second embedding associated with the second integer value;

perform an element-wise operation using the first embedding associated with the first integer value and the second embedding associated with the second integer value, wherein the mean embedding is generated based at least in part on the element-wise operation.

9. The computing system of claim 1, and wherein the sequence of instructions, when executed, further cause the one or more processors to:

receive computing device information identifying the first computing device;

generate a prompt, wherein the prompt comprises the computing device information; and concatenate the first integer value with the prompt, wherein the candidate information element token is selected based at least in part on the first integer value concatenated with the prompt.

10. The computing system of claim 9, wherein the sequence of instructions, when executed, further cause the one or more processors to:

access the prompt and the mean embedding;

identify a plurality of candidate information element tokens from the vocabulary, including the candidate information element token, based at least in part on the mean embedding and the prompt.

11. The computing system of claim 1, wherein the computing system comprising a machine learning model, wherein the sequence of instructions, when executed, further cause the one or more processors to:

perform, via an embedding layer of the machine learning model, a lookup operation to identify a plurality of candidate information element tokens from the vocabulary based at least in part on the mean embedding; and access the candidate information element token from the plurality of candidate information element tokens based at least in part on the lookup operation.

* * * * *